United States Patent [19]

Parsley et al.

[11] Patent Number: 4,946,341
[45] Date of Patent: Aug. 7, 1990

[54] APPARATUS FOR DISPENSING PARTS

[75] Inventors: Clovis L. Parsley; Carl D. Curtis; Marvin D. Atchison; Brett A. Seidle, all of Bedford; Danny R. Cousineau, Mitchell, all of Ind.

[73] Assignee: General Motors Corporation, Detroit, Mich.

[21] Appl. No.: 363,189

[22] Filed: Jun. 8, 1989

[51] Int. Cl.$^5$ .............................................. B65G 59/04
[52] U.S. Cl. ................................ 414/796.7; 414/797.1; 271/155; 271/901
[58] Field of Search ............... 414/796.7, 797.1, 793.2; 271/152, 153, 154, 155, 901, 18.1

[56] References Cited
FOREIGN PATENT DOCUMENTS

0199728 12/1982 Japan .................................. 414/797.1

Primary Examiner—David A. Bucci
Assistant Examiner—James T. Eller, Jr.
Attorney, Agent, or Firm—Douglas D. Fekete

[57] ABSTRACT

Apparatus for dispensing an individual part from a stack of a plurality of identical parts includes a magazine for receiving the stack of parts and an elevator movable in the magazine by an electrical motor for raising the stack for positioning an uppermost part at a pick-up position. The stack is raised until the uppermost part contacts and electrically connects spaced apart magnetic contacts on a pick-up member positioned above the pick-up position. The magnetic contacts constitute a switch of a control circuit that deactuates the electrical motor so as to position the uppermost part at the pick-up position for removal from the stack by the pick-up member. The magnetic contacts on the pick-up member not only constitute a switch of the control circuit but also exert a sufficient magnetic attraction force on the uppermost part to lift it from the stack.

10 Claims, 5 Drawing Sheets

APPARATUS FOR DISPENSING PARTS

FIELD OF THE INVENTION

The present invention relates to apparatus for dispensing an individual part from a stack of identical parts.

BACKGROUND OF THE INVENTION

In casting certain automotive pistons, a reinforcing insert or strut is first positioned on a sectionalized mold core, a sectionalized permanent mold is closed about the core and molten aluminum is cast into the mold about the core. When the molten aluminum solidifies, the reinforcing strut remains captured in the cast piston to enhance the strength and thermal expansion characteristics of the piston.

The reinforcing struts typically are individual steel stampings supplied to the production casting line in a stack of identical struts nested one next to the other.

Heretofore in the production of strut-reinforced cast aluminum pistons, a stack of the steel reinforcing struts is placed in a vertical, tubular magazine for dispensing one by one to the core of the permanent casting mold. The reinforcing struts are fed successively by gravity to the open bottom end of the tubular magazine where a reciprocating stripper slide slides past the lower end of the stack to strip the lowermost strut from the stack and carry the stripped strut to a pick-up position. The stripped strut is transferred at the pick-up position from the slide to the mold core by a pivotal arm having a pick-up head with spaced apart pick-up magnets thereon. The pick-up head is lowered to pick up the stripped strut and carry it to the mold core for positioning thereon.

The type of strut dispenser described above suffers from numerous disadvantages. For example, the strut dispenser requires that the strut being stripped (removed) from the stack slide past the next adjacent strut in the stack. Since the struts are steel stampings with sharp corners and occasional burrs, sliding of the stripped strut can be obstructed and result in jamming of the strut in the magazine, resulting in a major source of production downtime to unjam the strut dispenser and causing unreliable operation of the strut dispenser. In some severe situations, the stamped struts must be subjected to a supplemental de-burring operation to achieve satisfactory operation of the strut dispenser in high production piston casting operations.

Moreover, variations in the thickness, flatness and surface roughness of the struts have been found to hinder satisfactory operation of the strut dispenser described above. In addition, variations in the height of the stack of struts as struts are dispensed changes the weight of the strut stack. This variation in the weight of the stack of struts has also been found to hinder satisfactory operation of the strut dispenser.

SUMMARY OF THE INVENTION

An object of the invention is to provide an improved apparatus for successively dispensing individual parts from a stack of identical parts and overcoming the disadvantages enumerated hereinabove. The apparatus of the invention is especially useful, although not limited, to dispensing individual steel reinforcing struts from a stack thereof for use in the permanent mold casting of reinforced aluminum pistons.

The apparatus of the invention comprises a supply magazine for receiving a stack of the parts to be individually dispensed, an elevator disposed in the supply magazine for supporting the stack of parts and movable to raise the stack for positioning an uppermost part of the stack at a pick-up position and an electrical motor actuatable to raise the elevator. A pick-up member is movable to a load position above the pick-up position for lifting the uppermost part positioned at the pick-up position from the stack. In particular, the pick-up member includes at least two spaced magnetic contacts so disposed on the pick-up member that each magnetic contact engages a respective magnetically susceptible site of the uppermost part when the uppermost part is positioned at the pick-up position. The magnetic contacts have sufficient magnetic attraction force relative to the sites to lift the uppermost part from the stack.

A control circuit is provided for actuating the electrical motor to raise the stack toward the pick-up member positioned at the load position to bring the sites of the uppermost part into contact with the magnetic contacts of the pick-up member. The magnetic contacts comprise a switch of the control circuit for generating, when electrically connected by the uppermost part, a motor stop signal for deactuating the electrical motor. The uppermost part of the stack is thereby positioned at the pick-up position for removal from the stack by the pick-up member.

The switch is incorporated into a low voltage circuit (e.g., a 12 V AC circuit) and controls a sensor relay that is used to deactuate the electrical motor when the uppermost part contacts the magnetic contacts.

The magnetic contacts of the pick-up member serve multiple functions; namely, to attract and lift the uppermost part from the stack and also to constitute a switch of the control circuit for deactuating the electrical motor to position the uppermost part at the pick-up position.

The improved apparatus of the invention is advantageous in several respects. Since the uppermost part of the stack is lifted from the stack at the pick-up position without any relative sliding motion between adjacent parts in the stack, there is no problem of jamming of the stripped part in the magazine. Elimination of jamming during removal of the uppermost part from the magazine also permits use of stamped parts with burrs; i.e., there is no need to conduct a supplementary de-burring operation on the parts.

Since the movement of each part toward the pick-up member is controlled, in effect, by that particular part (i.e., its position relative to the magnetic contacts on the pick-up member), the improved apparatus of the invention can also accommodate variations in part thickness, flatness and surface roughness (i.e., non-uniform parts) and still provide consistent dispensing of such non-uniform parts. Moreover, variations in the height and thus the weight of the stack of parts as the parts are dispensed has no influence on the dispensing action of the apparatus; i.e., the parts are consistently dispensed regardless of stack height and weight.

These and other advantages and objects of the invention will become more readily apparent from the following detailed description taken in conjunction with the drawings.

DETAILED DESCRIPTION OF THE INVENTION

Referring now in detail to the drawings, an automatic-type piston casting apparatus includes a pair of side-by-side identical permanent molds (only mold 12 shown) adapted to receive, when closed, molten aluminum for forming a cast aluminum piston (not shown) having a reinforcing strut incorporated therein for improved strength and thermal expansion characteristics.

Figure 1:
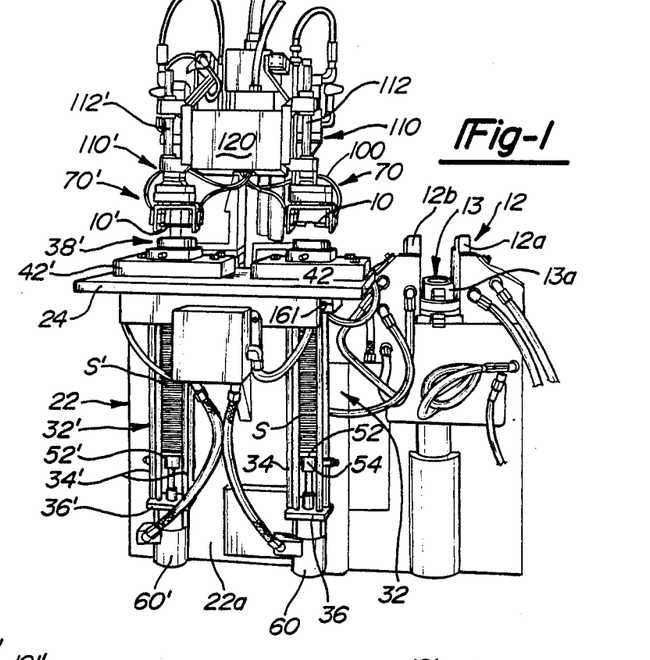
FIG. 1 is a perspective view of an automatic-type piston casting apparatus having a strut dispenser constructed in accordance with the invention.

Only one of the molds 12 is shown in FIG. 1. The other of the molds 12 is positioned spaced behind the mold 12 in FIG. 1. The molds each comprise first and second mold halves (e.g. mold halves 12a, 12b) movable between an open position and a closed position about a respective sectionalized mold core (only core 13 shown) positioned between the mold halves. Each mold core is retractible and expandible in a direction normal to the direction of opening and closing of the molds. A strut is captured by each core by first positioning a respective strut around each retracted core and then expanding each core against the strut. Each set of mold halves (e.g., mold halves 12a, 12b) is then closed about the core (e.g., core 13) to form a mold cavity for receiving the molten aluminum. The molds and cores are not shown in detail since they form no part of the invention.

FIGS. 1-8 illustrate an apparatus constructed in accordance with the invention for dispensing in unison a pair of struts 10, 10' to the pair of mold cores (only mold core 13 shown), one strut being provided to each mold core. The apparatus includes a base 22 with a top plate 24 for supporting a pair of identical strut magazines 32, 32'. Each strut magazine 32, 32' is adapted to receive a stack S, S' of identical struts 10, 10' nested vertically one atop the other. Each strut 10, 10' comprises a substantially planar, hollow, thin steel stamping having a general rectangular profile when viewed in plan, FIG. 9, with opposite rectilinear major sides 10a, 10a' and opposite arcuate minor sides 10b, 10b'. Major sides 10a, 10a' may include a central upwardly bulging portion 10c, 10c' depending upon the particular piston reinforcing design involved.

Each magazine 32, 32' is defined by a plurality of spaced apart upstanding rods 34, 34' fastened between a lower magazine plate 36, 36' and an upper magazine plate assembly 38, 38'. Each lower magazine plate 36 is fastened to the side 22a of the base 22. Each upper magazine plate assembly 38, 38' includes a smaller upper plate 38a, 38a' that defines an upper open magazine discharge mouth 38b, 38b' through which the uppermost strut of each stack S, S' is dispensed as will be explained. The upper magazine plate assembly 38, 38' includes a larger lower plate 38c, 38c' fastened (e.g. bolted) to a horizontal support plate 42, 42' itself fastened (e.g. bolted) on top plate 24 of the base 22, 22'. The top plate 24 and the support plate 42, 42' include suitable openings through which the stacks S, S' of struts 10, 10' can extend upwardly to the open discharge mouth 38b, 38b'.

The upper ends of the rods 34, 34' are threaded into the underside of the upper magazine plate assembly 38, 38' while the lower ends of rods 34, 34' are threaded into the lower magazine plate 36, 36'. The rods 34, 34' are arranged in a spaced pattern to form each upstanding magazine 32, 32' with an appropriate shape for receiving the stack S, S' of struts 10, 10'.

An elevator 50, 50' is operatively associated with each magazine 32, 32' for supporting a respective stack S, S' of struts 10, 10' and for up and down movement in the respective magazine. In particular, each elevator 50, 50' includes an elevator platform 52, 52' disposed within the respective magazine 32, 32' and on which the respective stack S, S' of struts 10, 10' rests. Threaded driven nut 54, 54' (described in detail hereinbelow) is fastened to the elevator platform 52, 52'. The driven nut of each elevator 50, 50' receives a threaded drive shaft 56, 56', FIG. 4. The drive shaft 56, 56' is connected for rotation by the output shaft of a 120 V, low RPM reversible electrical motor 60, 60' via a mechanical coupling 61, 61'. Each electrical motor 60, 60' is supported from the respective lower magazine plate 36, 36' by support structure 37, 37'. Alternatively, each motor 60, 60' can be attached directly to the respective lower magazine plate 36, 36'. The drive shaft 56, 56' is driven in rotation by the electrical motor 60, 60' in one direction to raise the elevator 50, 50' and in the opposite direction to lower the elevator 50, 50'. The drive shaft 56, 56' extends through the drive nut 54, 54' and through a suitable opening (FIGS. 4-5) in the elevator platform 52, 52'.

As will be explained hereinbelow, the driven nut 54, 54' of each elevator 50, 50' includes a release mechanism 58, 58' to temporarily decouple the driven nut 54, 54' and the drive shaft 56, 56' to permit rapid lowering of each elevator 50, 50' for loading of a stack S, S' of struts 10, 10' after a previous stack is dispensed.

Figure 2:
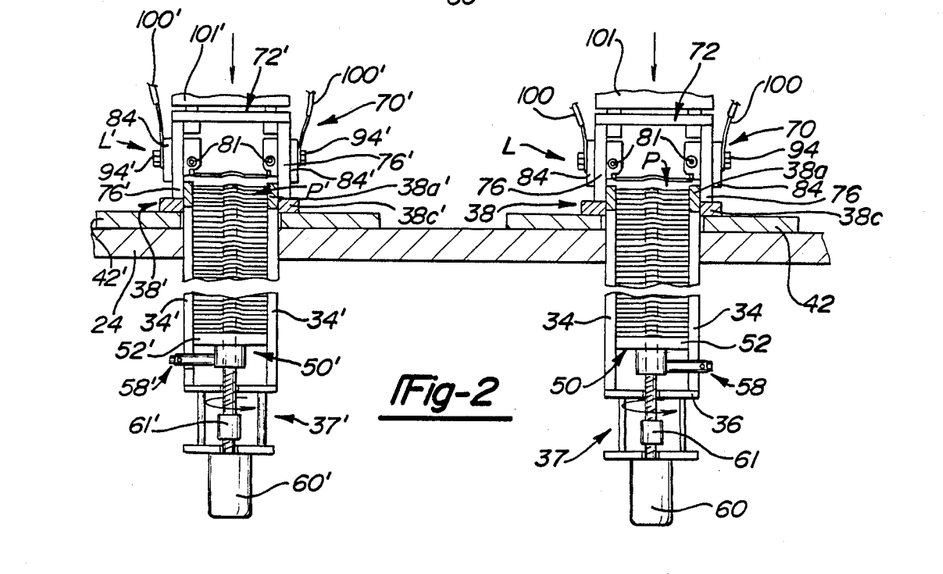
FIG. 2 is a side elevation of the strut dispensing apparatus of the invention with the pick-up members at load positions.

As will be explained herebelow, the elevators 50, 50' are raised in unison by the electrical motors so as to move the stacks S, S' of struts thereon upwardly to position the uppermost strut of each stack at a pick-up position P, P' below a respective pick-up member or head 70, 70' positioned at a load position L, L' thereabove, e.g., as shown in FIG. 2. Each pick-up member 70, 70' includes an inverted U-shaped frame 72, 72' having a horizontal plate 74, 74' and a pair of legs 76, 76' depending from the horizontal plate 74, 74', FIG. 3. Each depending leg 76, 76' includes an electrical insulative mounting 78, 78' fastened to the respective leg 76, 76' by multiple fasteners. Each insulative mounting 78, 78' includes an inner mounting 82, 82' in which the cylindrical magnetic contact 80, 80' is partially received, FIG. 7, and held by a set screw 81, 81' and an outer mounting 84, 84', FIGS. 2–4. Each magnetic contact 80, 80' comprises a cylindrical permanent magnet 90, 90' received within a non-magnetic stainless steel sleeve 92, 92'. The magnetic contacts 80, 80' are vertically oriented with their lowermost portions 80a, 80a' exposed. The bottom ends 80b, 80b' of the magnetic contacts 80, 80' are coplanar for contacting the minor sides 10b, 10b' of the uppermost strut of the stack S, S' as will be explained.

Figure 7:
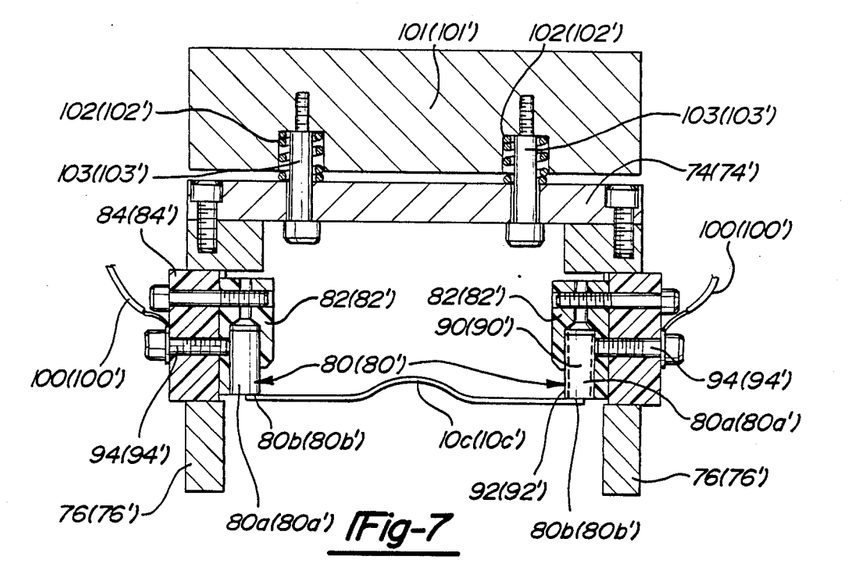
FIG. 7 is a sectional view of the pick-up member 70, 70'.

An electrical connection is made to each set of magnetic contacts 80, 80' by metal screws 94, 94' threaded through the respective mounting 78, 78' into contact with the outer stainless steel sleeve 92, 92' of each magnetic contact 80, 80'. A lead wire 100, 100' is connected to the outer head of each screw 94, 94' as shown in FIG. 7. Contacts 80, 80', fasteners 94, 94' and lead wires 100, 100' are incorporated into the control circuit C to be described herebelow for controlling deactuation of the electrical motor 60, 60'.

Figure 8:
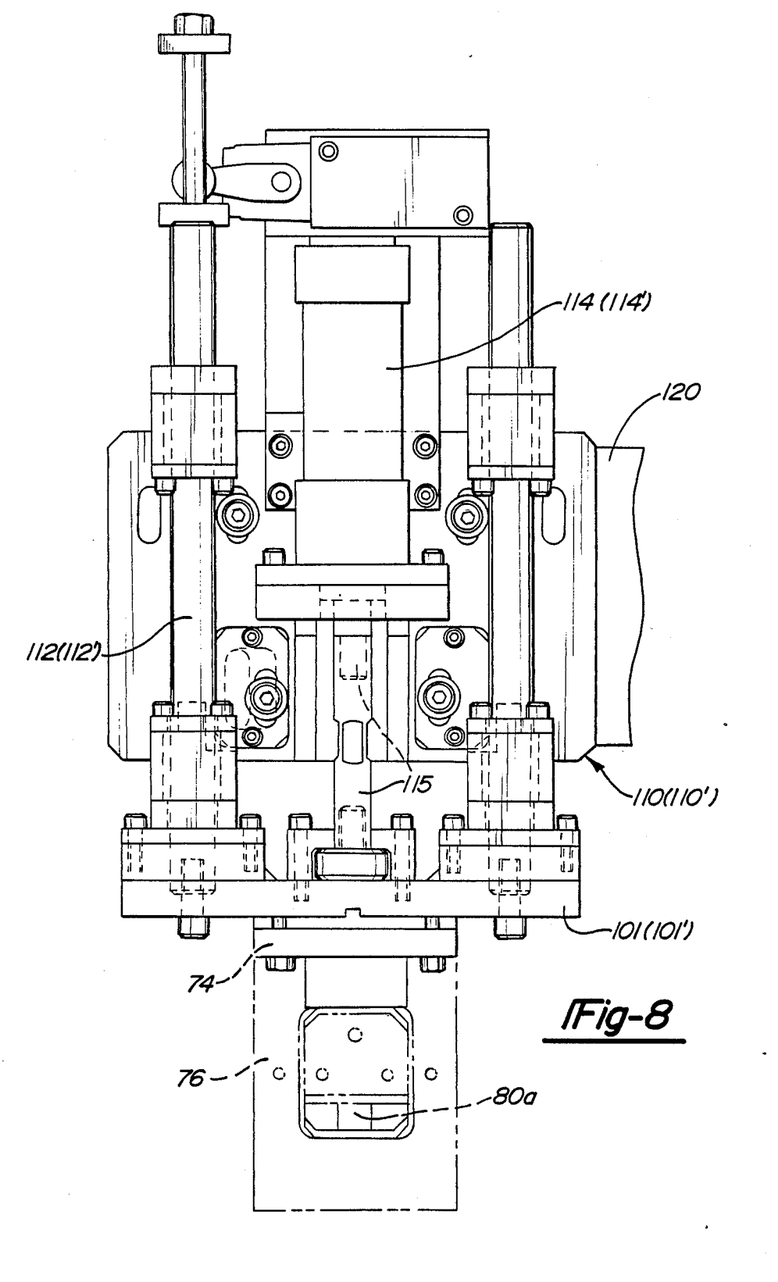
FIG. 8 is a side elevation of fluid cylinder and guide rods for raising and lowering pick-up member 70, 70'.
Figure 9:
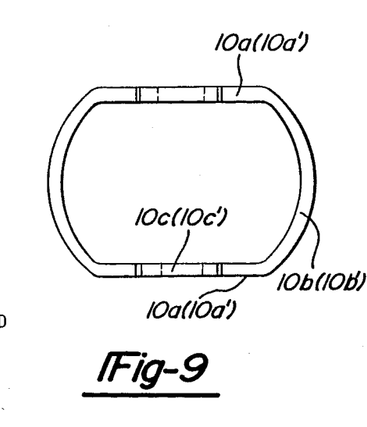
FIG. 9 is a plan view of the reinforcing strut.

The frame 72, 72' of each pick-up member 70, 70' is mounted for lost-motion relative to a respective horizontal support plate 101, 101'. The lost motion mounting is achieved by suspending each frame 72, 72' on depending fasteners 103, 103' with coil springs 102, 102' disposed between the horizontal plate 74, 74' of the frame 72, 72' and the horizontal plate 100, 100' thereabove. Each support plate 100, 100' itself is carried on a respective support assembly 110, 110'. Each support assembly 110, 110' is mounted for up and down movement in unison on a common pivotal arm 120 by a respective pair of guide rods 112, 112' and the plunger 115, 115' of a fluid cylinder 114, 114'; e.g., as best shown in FIG. 8.

Figure 3:
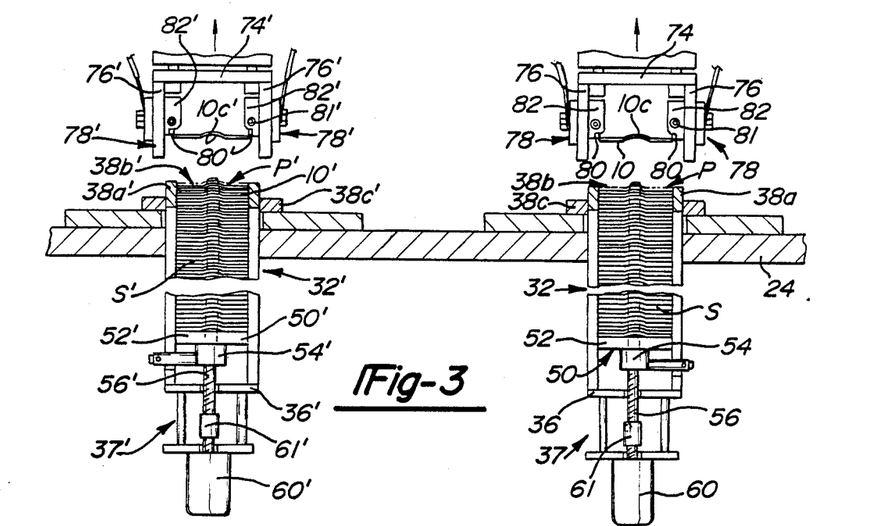
FIG. 3 is similar to FIG. 2 with the pick-up members at retracted positions.

Referring to FIG. 3, the pick-up members 70, 70' are initially positioned above the respective magazine 32, 32' with the plungers 115, 115' retracted. Then, the pick-up members 70, 70' are positioned at the lower load positions L, L', FIG. 2, as a result of the fluid cylinders 114, 114' extending plungers 115, 115' in unison. At the load positions L, L' the depending legs 76, 76' of each pick-up member 70, 70' straddle the respective discharge mouth 38b, 38b' of the respective magazine 32, 32' therebelow with the lower ends of the legs 76, 76' abutting the lower plate 38c, 38c' of the magazine plate assembly 38, 38', FIG. 2 and 4. The lost motion mounting of the frame 72, 72' on the plate 100, 100' provides controlled abutment of the depending legs 76, 76' and the lower magazine plate 38c, 38c'. Abutment of the legs 76, 76' and the lower plate 38c, 38c' positions the bottom ends 80b, 80b' the magnetic contacts 80, 80' in close proximity to the minor sides 10b, 10b' of the uppermost strut of each stack S, S' positioned at the respective pick-up positions P, P' so as to attract and contact the uppermost strut. In the figures, the clearance between the bottom ends 80b, 80b' and the uppermost struts is shown exaggerated for clarity Typically, a clearance of about 0.050 inch is provided between the bottom ends 80b, 80b' and the top of magazine plate 38a, 38a'.

As is apparent from FIGS. 2 and 7, the magnetic contacts 80, 80' are spaced apart on each frame 72, 72' so as to attract and contact a central portion or site of each minor side 10b, 10b' of each uppermost strut of the stacks S, S'. That is, the central portion contacted by the magnetic contacts 80, 80' is generally equidistant from major sides 10a, 10a'. Since the struts 10, 10' are made of steel, the central portions (sites) of the minor sides 10b, 10b' are susceptible to magnetic attraction and are in electrical communication with one another (i.e., an electrical conductive pathway is provided therebetween).

In operation, the electrical motors 60, 60' are actuated in unison to raise the associated elevator 50, 50' upon movement of the pick-up members 70, 70' in unison from the retracted positions shown in FIG. 3 to the load positions L, L' shown in FIG. 2. Actuation of the electrical motors 60, 60' raises the elevators 50, 50' to position the uppermost strut of each stack S, S' at the pick-up positions P, P' beneath the load positions L, L' until the minor sides of each uppermost strut contact the pair of spaced apart magnetic contacts 80, 80' on the pick-up member 70, 70' thereabove. Upon such contact being made, the magnetic contacts of each pick-up member are electrically connected and, through the control circuit C, deactuate the respective electrical motor as explained below. In this way, the uppermost strut of each stack is positioned at the pick-up positions P, P' for removal from the stack by the respective pick-up member 70, 70'.

Use of the low RPM (e.g., 55 RPM) electrical motors 60, 60' with the threaded drive shaft/driven nut provides a lifting motion for each stack S, S' of struts of sufficiently low velocity to permit accurate vertical positioning of each successive uppermost strut.

Figure 10:
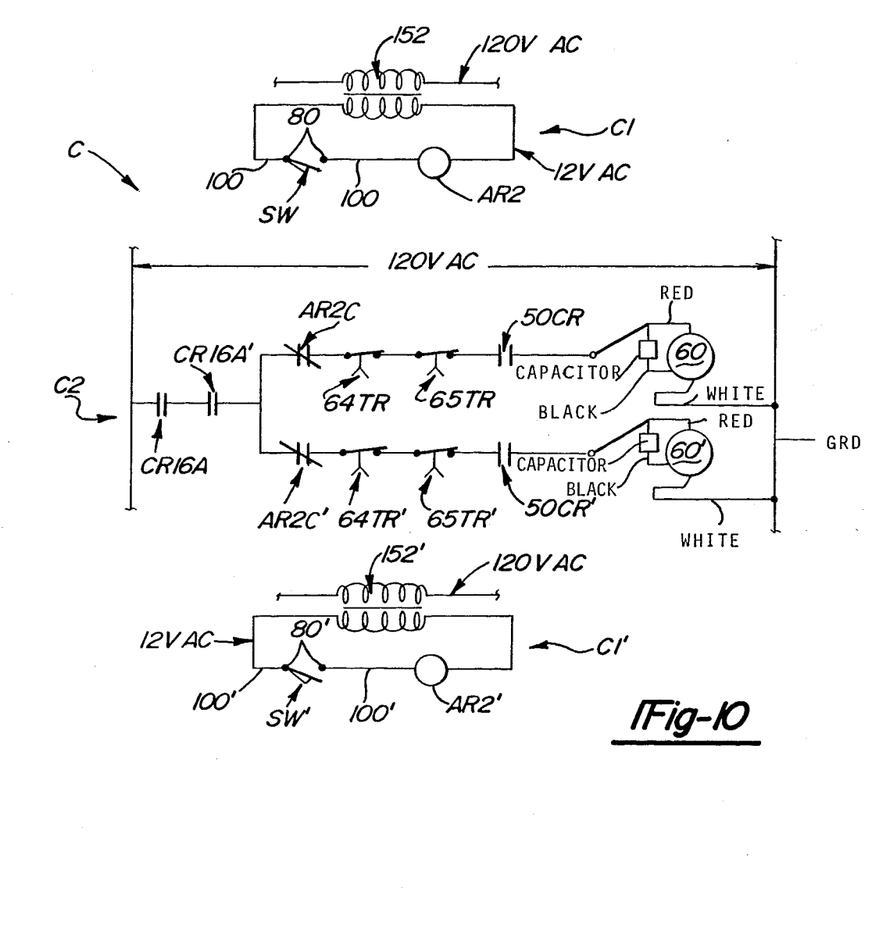
FIG. 10 is a diagrammatic representation of the control circuit for controlling the electrical motors 60, 60'.

An exemplary control circuit C including a high voltage (e.g. 120 V) circuit C2 and a pair of identical low voltage (e.g. 12 V) circuits C1, C1' for controlling actuation of each of the electrical motors 60, 60' is shown diagrammatically in FIG. 10.

As mentioned above, each electrical motor 60, 60' is actuated (energized) to raise the elevator 50, 50' upon movement of the pick-up members 70, 70' from the retracted positions (FIG. 3) to the load positions L, L' (FIG. 2). In particular, each pick-up member trips a respective limit switch (not shown) as each pick-up head 70, 70' is moved to its load position L, L' so as to close a respective relay CR16A, CR16A' , that is normally open. Circuit C2 also includes start contacts 50CR, 50CR' that are closed in response to operations at the mold that indicate that the casting cycle is in readiness to commence the transfer of struts. Closing of the relays CR16A, CR16A' and contacts 50CR, 50CR' actuates each electrical motor 60, 60' to raise the stacks S, S' to bring the uppermost strut thereon into contact with the magnetic contacts 80, 80' of the pick-up member 70, 70' positioned thereabove at the load position as explained herebelow. When the magnetic contacts 80, 80' of each pick-up member 70, 70' are electrically connected by virtue of contacting the minor sides 10b, 10b' of each uppermost strut positioned at the pick-up positions P, P', each contact AR2C, AR2C' in series with the respective electrical motor 60, 60' in circuit C2 is opened to deactuate the respective motor.

Each low voltage circuit C1 and C1' in FIG. 10 is provided for generating a motor stop signal for motor 60, 60' and comprises a sensor relay AR2, AR2' associated with a contract AR2C, AR2C' in circuit C2, such that each contact AR2C, AR2C' is normally closed and is opened in response to the stop motor signal. Each circuit C1, C1' receives low voltage AC power (12 V AC) via a transformer 152, 152' and includes a switch SW, SW' comprised of the spaced apart magnetic contacts 80, 80' on each pick-up member 70, 70' as well as the associated lead wires 100, 100' and screws 94, 94'.

The motor stop signal is generated by each low voltage circuit C1, C1' when the uppermost strut of each stack S, S' electrically connects the associated set of magnetic contacts 80, 80'. This electrical signal energizes each sensor relay AR2, AR2' in circuit C1, C1', hence opening the contacts AR2C, AR2C' in circuit C2. As a result of opening of the contact AR2C, AR2C' in circuit C2, each electrical motor 60, 60' is stopped with the uppermost strut of each stack S, S' at the pick-up positions P, P' for removal by the respective pick-up member 70, 70'.

Normally closed timing relays 64TR, 64TR' are included in circuit C2 as shown to shut off each electrical motor 60, 60' after a given time period if contact AR2C, AR2C' remains closed, for example, as a result of no more struts being present in the magazine 32, 32' or as a result of some malfunction of the elevator 50, 50' in presenting a strut for removal. Normally closed timing relays 65TR, 65TR' are also present in circuit C2 as shown for purposes explained herebelow.

Moreover, the sensor relays AR2, AR2' in circuits C1, C1' can be interfaced with other relay circuits of the master control circuit of the piston casting apparatus. For example, the sensor relays AR2, AR2' can be interfaced with a relay circuit that will stop movement of the pivotal arm 120 in the event a strut is missing (e.g. falls) from one of the pick-up members 70, 70' during movement between the load positions L, L' and the strut discharge positions (i.e. where the struts are captured on the mold cores) and will also initiate a suitable visual and/or audible alarm to make the machine operator aware that a strut is missing.

In operation, after the uppermost strut of each stack S, S' is lifted from the stack by the magnetic contacts 80, 80' on the pick-up members 70, 70', the plungers 115, 115' of the fluid cylinders 114, 114' are retracted in unison to move the pick-up members 70, 70' to the retracted position, FIG. 3, above the magazines 32, 32'. The pivotal arm 120 is then pivoted by suitable means, such as an electrical or fluid motor, to position the pick-up members 70, 70' above a respective retracted mold core (e.g. core 13) with the pick-up members 70, 70' still retracted and the mold halves (e.g. mold halves 12a, 12b) open. The plungers 115, 115' of the fluid cylinders 114, 114' are then extended in unison to lower the pick-up members 70, 70' to position the struts about the retracted core therebelow. Each core is then expanded (e.g. by moving outer core portions 13a, only one shown) outwardly and raising an inner core portion (not shown) therebetween to capture the strut positioned therearound by the respective pick-up member 70, 70'. The plungers 115, 115' of the cylinders 114, 114' are then retracted in unison to raise the pick-up members 70, 70' away from the expanded cores such that the struts remain captured on the expanded cores. The mold halves (e.g. mold halves 12a, 12b) are then closed about the respective cores (e.g. core 13) to receive molten aluminum for casting a piston. Following retraction of the plungers 115, 115' the pivotal arm 120 is returned to the position of FIG. 3 above the magazines 32, 32' with the plungers 115, 115' still retracted. The plungers of the cylinders 114, 114' are then extended in unison to move the pick-up members 70, 70' to their respective load positions L, L' above the magazines 32, 32' to remove the next uppermost strut from each stack S, S' for subsequent placement on the cores (e.g., core 13) after the solidified strut-reinforced aluminum pistons are removed from molds (e.g. mold 12). This sequence is repeated as needed to make strut-reinforced cast aluminum pistons on an automatic, high production basis.

Eventually, the stacks S, S' of struts are depleted to the extent that each elevator platform 52, 52' trips a respective indicator switch (only switch 161 shown) adjacent the upper portion of each magazine 32, 32', e g., see FIG. 1. Actuation of each indicator switch (e.g., switch 161) effects opening of the normally closed timing relay 65TR, 65TR' in circuit C2 after a given time period and, in turn, deactuates the respective electrical motor 60, 60'.

Figure 4:
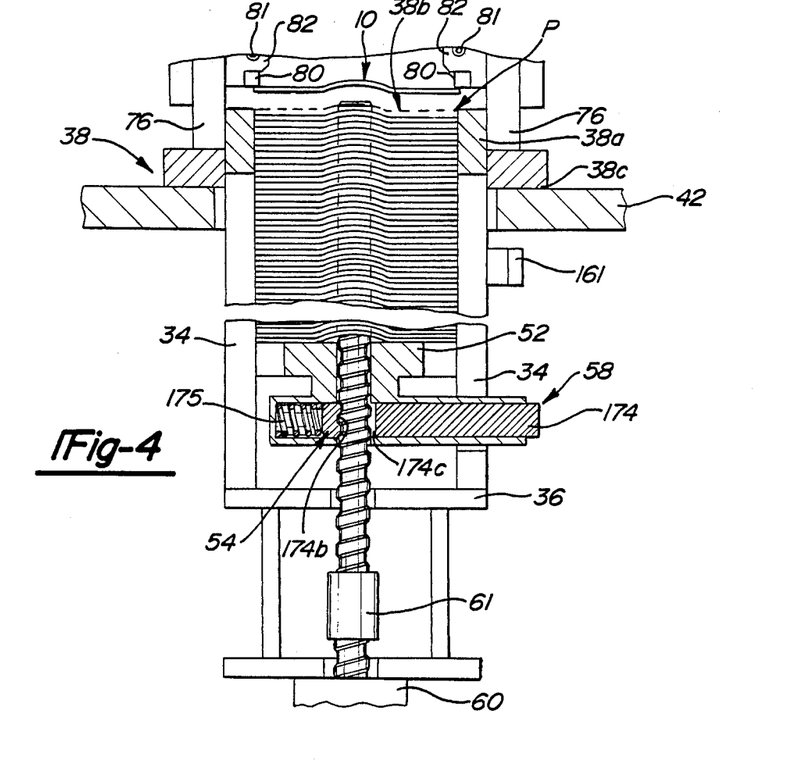
FIG. 4 is an enlarged side elevation of a portion of the apparatus of FIG. 2 showing the elevator release mechanism in section.
Figure 5:
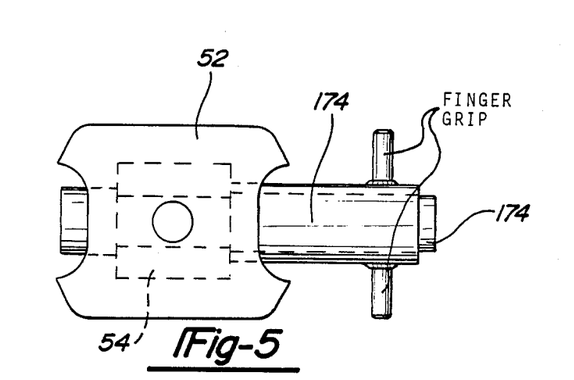
FIG. 5 is a plan view of the elevator platform and release mechanism.
Figure 6:
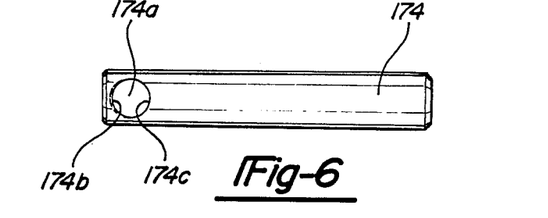
FIG. 6 is a side elevation of the depressable release shaft of the release mechanism.

Each elevator then can be lowered rapidly using identical release mechanisms 58, 58' associated with the driven nut 54, 54'. Release mechanisms 58, 58' differ only in orientation, one (58) extending to the right in FIG. 2 and the other (58') to the left. With reference to FIGS. 4–6, the machine operator manually depresses a release shaft 174 of the driven nut 54 against the bias of a coil spring 175 to decouple the driven nut 54 and the drive shaft 56. In particular, an oval opening 174a is provided in the shaft 174 and includes a threaded portion 174b on one side and a smooth, unthreaded portion 174c on the other side such that movement of the shaft 174 to the left in FIG. 4 disengages the threaded portion 174b from the threaded drive shaft 56. The elevator platform 52 can then be rapidly lowered by hand to the lower end of the drive shaft 56 to provide space in the magazine 32 to receive another stack S of struts loaded through the respective open discharge mouth 38b of the magazine 32. The release mechanism 58 permits rapid lowering of the elevator platform 52 without having to use the low RPM electrical motor 60 for this purpose. The elevators 50, 50' are operable with strut stacks S, S' of different heights.

Although the invention has been illustrated hereinabove as including two strut dispensing apparatus operable in unison to supply a pair of struts to the mold cores, those skilled in the art will appreciate that one or more of such apparatus can be used consistent with the number of molds/cores employed. Moreover, the apparatus of the invention is not limited to dispensing steel piston reinforcing struts and may find use in dispensing other types of parts.

While certain specific and preferred embodiments of the invention have been described in detail hereinabove, those skilled in the art will recognize that various modifications and changes can be made therein within the scope of the appended claims which are intended to include equivalents of such embodiments.

We claim:

1. Apparatus for dispensing an individual part from a stack of identical parts wherein each part includes at least two spaced sites susceptible to magnetic attraction and an electrical conductive pathway interconnecting said sites, comprising:
   (a) a supply magazine for receiving the stack of parts,
   (b) an elevator disposed in the supply magazine for supporting the stack of parts and movable to raise the stack for positioning an uppermost part of the stack at a pick-up position,
   (c) an electrical motor actuable to raise the elevator,
   (d) a pick-up member movable to a load position above the pick-up position and comprising at least two spaced magnetic contacts, each contact being disposed for contact with a respective magnetically susceptible site of the uppermost part at the pick-up position, said magnetic contacts having sufficient magnetic attraction force relative to said sites to lift said uppermost part from the stack, and (e) control circuit means for actuating the electrical motor to raise the stack toward the pick-up member positioned at the load position to bring the sites of said uppermost part into contact with said pick-up member contacts, said control circuit means comprising a switch for generating a motor stop signal for deactuating the electrical motor to thereby stop the elevator, said switch comprising the pick-up member magnetic contacts and being closed by a part therebetween whereby when said pick-up member is at said load position, said control circuit means actuates said motor to raise the stack and thereby bring the uppermost part into contact with the pick-up member magnetic contacts, whereupon said switch is closed to deactuate the motor and thereby discontinue raising of the elevator.

2. The apparatus of claim 1 wherein each magnetic contact comprises a permanent magnet.

3. The apparatus of claim 1 wherein the pick-up member is disposed on a pivotal arm for movement between the load position and a part discharge position where the individual part is removed from the pick-up member.

4. The apparatus of claim 1 including a threaded drive screw operatively connected to said electrical motor for rotation thereby and threadedly connected to the elevator such that said elevator raises in response to rotation of the drive screw.

5. The apparatus of claim 4 including a release mechanism to temporarily disengage the elevator and the drive screw to permit rapid lowering of the elevator for loading struts thereon.

6. Apparatus for individually dispensing an annular, generally planar, iron part having spaced apart sides from a stack of a plurality of identical parts, comprising:
(a) a supply magazine for receiving the stack of parts,
(b) an elevator disposed in the supply magazine for supporting the stack and movable to raise the stack for positioning an uppermost part of the stack at a pick-up position,
(c) an electrical motor actuable to raise the elevator,
(d) a pick-up member movable to a load position above the pick-up position and comprising spaced apart magnetic contacts for engaging the uppermost part at the pick-up position at spaced sites and for magnetically coupling to said part with sufficient magnetic force for lifting said uppermost strut from the stack,
(e) a control circuit means for actuating the electrical motor when the pick-up member is positioned at the load position to bring said uppermost strut into contact with said magnetic contacts, said control circuit means including a switch comprising the magnetic contacts and having an open condition in the absence of contact with the uppermost part for actuating the motor to raise the stack and a closed position that includes contact with the uppermost strut, whereupon in said closed position said circuit means generates a motor stop signal for deactuating the electrical motor, and
(f) means for moving the pick-up member from the load position to an unload position for discharge of a part carried thereby.

7. The apparatus of claim 6 wherein said means for moving the pick-up member comprises a pivotal arm on which the pick-up member is disposed.

8. The apparatus of claim 6 wherein the control circuit comprises a high voltage portion including said electrical motor and a low voltage portion comprising said switch.

9. The apparatus of claim 8 wherein the switch opens a normally closed relay in the high voltage portion such that the opened relay deactuates the electrical motor when the magnetic contacts are electrically connected by the uppermost strut.

10. The aparatus of claim 6 wherein the part is a piston reinforcement strut.

* * * * *